United States Patent
Li et al.

(10) Patent No.: US 11,050,659 B2
(45) Date of Patent: Jun. 29, 2021

(54) METHODS, COMPUTING DEVICES, AND STORAGE MEDIA FOR ADJUSTING NETWORK TRAFFIC

(71) Applicant: Tsinghua University, Beijing (CN)

(72) Inventors: Dan Li, Beijing (CN); Yang Cheng, Beijing (CN); Jianping Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/103,330

(22) Filed: Nov. 24, 2020

(65) Prior Publication Data
US 2021/0168065 A1    Jun. 3, 2021

(30) Foreign Application Priority Data
Nov. 29, 2019  (CN) .......................... 201911204067.6

(51) Int. Cl.
| | | |
|---|---|---|
| *H04L 12/707* | (2013.01) | |
| *H04L 12/733* | (2013.01) | |
| *H04L 12/835* | (2013.01) | |
| *H04L 12/801* | (2013.01) | |

(52) U.S. Cl.
CPC ............ *H04L 45/22* (2013.01); *H04L 45/122* (2013.01); *H04L 47/12* (2013.01); *H04L 47/30* (2013.01)

(58) Field of Classification Search
CPC ................................ H04L 45/00; H04L 47/00
See application file for complete search history.

(56) References Cited

U.S. PATENT DOCUMENTS

| | | | | |
|---|---|---|---|---|
| 10,476,619 | B2* | 11/2019 | Mahmood | ............... H04L 12/56 |
| 2015/0086202 | A1* | 3/2015 | Prakash | ............... H04J 14/021 |
| | | | | 398/49 |
| 2015/0333992 | A1* | 11/2015 | Vasseur | ............... H04L 12/4641 |
| | | | | 370/252 |
| 2016/0292305 | A1* | 10/2016 | Hu | ....................... G06F 16/9024 |
| 2017/0346727 | A1* | 11/2017 | Perrett | ................... H04L 45/126 |
| 2018/0343177 | A1 | 11/2018 | Fazlyab et al. | |
| 2019/0149457 | A1* | 5/2019 | Perrett | .................... H04L 45/28 |
| | | | | 370/216 |

OTHER PUBLICATIONS

CNIPA, First Office Action for CN Application No. 201911204067.6, dated Apr. 27, 2021.

* cited by examiner

*Primary Examiner* — Jung H Park
*Assistant Examiner* — Sumitra Ganguly
(74) *Attorney, Agent, or Firm* — Hodgson Russ LLP

(57) ABSTRACT

The disclosure provides a method for adjusting traffic for a network, a computing device, and a storage medium. The method includes: obtaining local network state information collected by any border router node in the network; and inputting the local network state information collected by the any border router node into a corresponding first preset trained sub-model, to output a proportion of traffic dispatched on each candidate path from a source border router node to a destination border router node, in which the source border router node is the any border router node, and the destination border router node is an egress border router node in the network.

17 Claims, 3 Drawing Sheets obtaining local network state information collected by any border router node in the network — S1

↓ inputting the local network state information collected by the any border router node into a corresponding first preset trained sub-model, to output a proportion of traffic dispatched on each candidate path from a source border router node to a destination border router node — S2

# METHODS, COMPUTING DEVICES, AND STORAGE MEDIA FOR ADJUSTING NETWORK TRAFFIC

CROSS-REFERENCE TO RELATED APPLICATION

This application claims priority to Chinese Patent Application No. 201911204067.6, filed on Nov. 29, 2019, the entire contents of which are incorporated herein by reference.

FIELD

The disclosure relates to the field of communication network technologies, and more particularly, to a method for dynamically adjusting network traffic, a computing device, and a storage medium.

BACKGROUND

Routing is a core of interconnection and communication among nodes in a modern network. A network system is becoming more and more complex as the expansion of network scale and the upgrading of network hardware. Conventional routing technologies based on network topology information cannot improve the operating efficiency of the network due to their inability to perceive characteristics of dynamic changes in network traffic. Network routing has become a main bottleneck of restricting the efficient operation of a large-scale network.

In order to improve the transmission efficiency of the networks, considering the characteristics of dynamic changes in network traffic, real-time routing planning approaches have received extensive attention, such as path planning may be solved in real time using linear programming constraint models. However, the real-time traffic in a network changes dynamically. It may introduce the significant computational overhead to solve the traffic forwarding planning problem in a large-scale network as the network scale increases, which cannot meet real-time requirements of traffic scheduling.

SUMMARY

A method for adjusting network traffic is provided according to a first aspect of embodiments of the disclosure. The method includes: obtaining local network state information collected by any border router node in the network; and inputting the local network state information collected by the any border router node into a corresponding first preset trained sub-model, to output a proportion of traffic dispatched on each candidate path from a source border router node to a destination border router node, in which the source border router node is the any border router node, and the destination border router node is an egress border router node in the network.

A computing device is provided according to a second aspect of embodiments of the disclosure. The computing device includes: a storage medium; a processor; and a computer program stored on the storage medium and capable of running on the processor. The processor is configured to invoke the program to execute the above method.

A non-transitory computer-readable storage medium is provided according to a third aspect of embodiments of the disclosure. The non-transitory computer-readable storage medium has stored computer instructions that when executed, cause a computer to execute the above method.

BRIEF DESCRIPTION OF THE DRAWINGS

In order to clearly illustrate embodiments of the disclosure or technical solutions in the related art, a brief description of drawings used in embodiments or in the related art descriptions is given below. Obviously, the drawings in the following descriptions are only part embodiments of the disclosure, and for those skilled in the art, other drawings can be obtained according to these drawings without creative labor.

DETAILED DESCRIPTION

In order to clearly illustrate embodiments of the disclosure or technical solutions in the related art, a brief description of drawings used in embodiments or in the related art descriptions is given below. Obviously, the drawings in the following descriptions are only part embodiments of the disclosure, and for those skilled in the art, other drawings can be obtained according to these drawings without creative labor.

Figure 1:
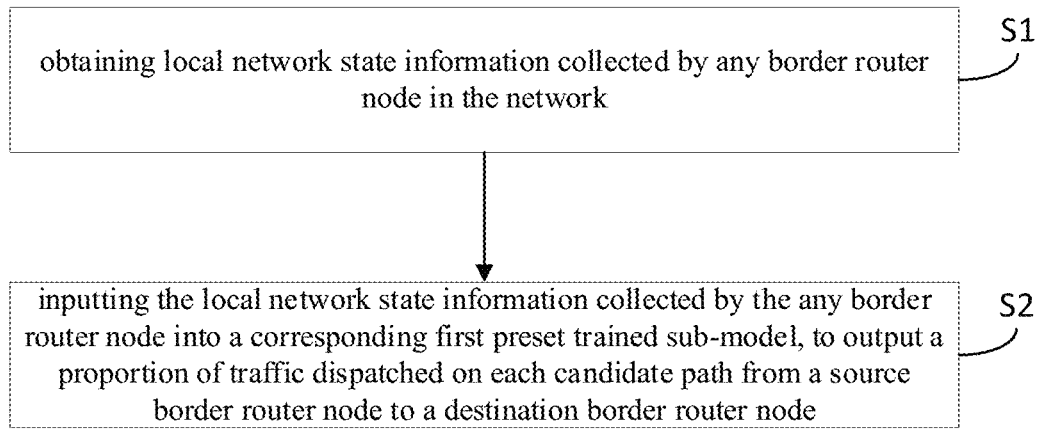
FIG. 1 is a flowchart of a method for dynamically adjusting traffic for a network according to embodiments of the disclosure.

A method for dynamically adjusting traffic for a network is provided in embodiments of the disclosure. FIG. 1 is a flowchart of a method for dynamically adjusting traffic for a network according to embodiments of the disclosure. The method may include: obtaining local network state information collected by any border router node in the network; and inputting the local network state information collected by the any border router node into a corresponding first preset trained sub-model, to output a proportion of traffic dispatched on each candidate path (or a proportion that how much traffic should be dispatched on each candidate path). The candidate path is defined as a path that how a packet forwarded from a source border router node to a destination border router node in a network, in which the source border router node is the any border router node, and the destination border router node is an egress border router node in the network.

Obviously, a network system is becoming more and more complex as the expansion of network scale and the upgrading of network hardware. Conventional routing technologies based on network topology information cannot improve the efficiency of networking services due to their inability to perceive characteristics of dynamic changes in network traffic. Network routing has become a main bottleneck of restricting the efficiency of large-scale network systems in terms of packet forwarding services. In conventional routing schemes that are widely used on the Internet, including but not limited to static routing approaches based on network topologies, traffic engineering, and the approaches on top of mathematical models, the unpredictable traffic burst will finally result in the unbalanced link utilization of networks, and the significant overhead for calculating the routing rules will result in the slow reaction of networks to the traffic that dynamically changes. The embodiments of the disclosure can adjust the proportion that how much traffic should be dispatched on each candidate path, such that the proper traffic amount may be dispatched on different network paths in changing network environments and the operation with a fast speed may be complemented. The embodiments of the disclosure aim to improve the output and stability of networking services.

Figure 2:
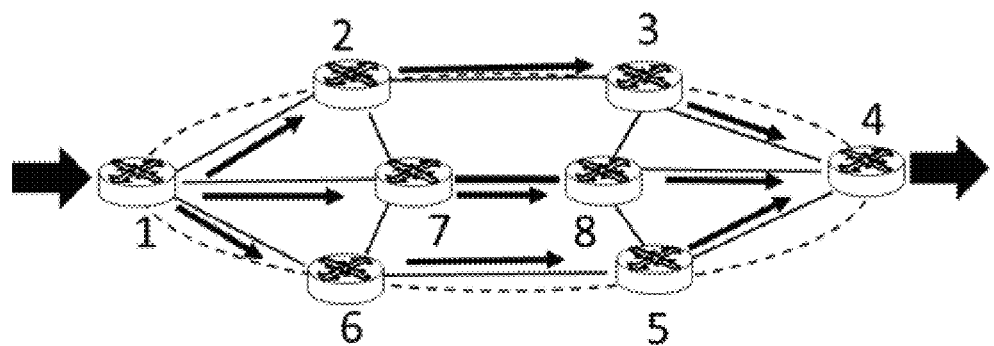
FIG. 2 is a schematic diagram of a network structure according to embodiments of the disclosure.

In detail, refer to FIG. 2, there are many router nodes in a network system. The router nodes in the network system may include border router nodes, internal router nodes, and switching devices (for example, switches in the network system). For example, router nodes numbered as 1, 2, 3, 4, 5 and 6 are the border router nodes, and router nodes numbered as 7 and 8 are the internal router nodes. The router nodes numbered as 1, 2, 3, 5, and 6 may be taken as source router nodes (also called as ingress border router nodes), and the router node numbered as 4 may be taken as the destination border router node (also called as the egress border router node). It should be noted here that all border router nodes may be used as both ingress border router nodes and egress border router nodes, because network traffic may be bidirectional. The role played by the router node, i.e., the ingress node or the egress node, depends on the direction of network traffic flow on the node. FIG. 2 only shows the direction of flow from the router node 1 to the router node 4.

At different moments, each source border router node may collect local network state information that reflects the runtime link congestion state on the path of source-destination pairs. The source border router may collect the local network state information with the help of network telemetry tools. For example, each source border router node may collect the local network state information by employing an in-band network telemetry (INT) technology or OSPF-TE (Open Shortest Path First-Traffic engineering), or other methods.

The embodiments of the disclosure may adjust the traffic amount on the network path based on the local network state information collected by the border router node in the network automatically and timely, ensuring the operating efficiency of the network system and improve network utilization.

Based on the above embodiments, in some embodiments of the disclosure, the local network state information collected by the any border router node includes a maximum link utilization rate of each candidate path from the source border router node to the destination border router node, and a maximum queuing length information of all network devices on each candidate path from the source border router node to the destination border router node.

It is understandable that, for router nodes in the network system, when the source border router node and the destination border router node are determined, there are a plurality of network paths from the source border router node to the destination border router node. During network data transmission, it is usual to select several optimal paths from all network paths. The selected several optimal paths may be referred to as candidate paths from the source border router node to the destination border router node. Each source border router node in the network system may collect the maximum link utilization rate of each candidate path from the source border router node to the destination border router node, and the maximum queuing length information of all network devices on each candidate path from the source border router node to the destination border router node. That is, for each moment and a designated pair of the source border router node and the destination border router node, the source border router node may collect the maximum link utilization rate of each candidate path from the source border router node to the destination border router node, and the maximum queuing length information of all network devices on each candidate path from the source border router node to the destination border router node.

In detail, considering that within a network (as shown in FIG. 2), each border router is geographically located at a different network location and has a different network observation perspective and control area. In the embodiments of the disclosure, each border router is taken as an independent intelligent routing decision unit, and each border router includes an agent model which assists the border router to make intelligent routing decision. The agent model is in the format of multi-layer neural network. On each border router: the local network state information may be collected through data collection technology, such as the in-band telemetry technology or OSPF-TE, and the local network state information may include the maximum link utilization rate of each candidate path and the maximum queuing length information of all network devices (including routers and switches) on each candidate path. The candidate path may refer to a reachable path from the border router as the starting node to the egress border router. The plurality of shortest paths may be selected as the candidate paths of the pair of the source border router node and the destination border router node.

For all network paths of the designated source border router node and destination border router node in the network system, a plurality of candidate paths may be determined from the all network paths through a preset method.

In detail, in a process of selecting candidate paths, the candidate paths may refer to reachable paths within a network domain that uses the ingress border router node as the starting node to reach the egress border router node (as shown in FIGS. 2, 1→2→3→4, 1→7→8→4, and 1→6→5→4 may be used as candidate paths from the border router node 1 to the border router node 4). By default, the oblivious routing (OR) method is used to calculate K (by default, K is set to 3) candidate paths with diversity; or the K shortest paths calculated using other path calculation methods (such as K-SPF) may also be used as candidate paths in the embodiments of the disclosure.

Based on the above embodiments, in some embodiments of the disclosure, each source border router node is corresponding to one first preset sub-model. There is a second preset sub-model. A plurality of first preset sub-model and the second preset sub-model form a preset model.

Each first preset sub-model is trained by the following action.

At a current moment, local network state information collected by each source border router node in the network is inputted to the first preset sub-model corresponding to each source border router node, to output a traffic proportion on each candidate path from each source border router node to the destination border router node.

The traffic proportion corresponding to each source border router node in the network may be combined to obtain a set of traffic proportions; and the local network state information collected by each source border router node may be combined to obtain global network state information.

The set of traffic proportions and the global network state information are inputted into the second preset sub-model, to output a corresponding current state-action value Q.

For any source border router node, each corresponding traffic proportion is replaced with an equal proportion, and traffic proportions of source border router nodes other than the any source border router node may be maintained, to form an updated set of traffic proportions.

The updated set of traffic proportions and the global network state information are inputted into the second preset sub-model again, to output a reference state-action value b corresponding to the any source border router node.

A contribution value A corresponding to a current action (i.e., the current traffic proportion) of the any source border router node may be obtained based on the current state-action value Q and the reference state-action value b corresponding to the any source border router node. It is noted that different border routers may take different observations of local network state, which would finally result in that they output different routing behaviors (i.e., the current traffic proportion) and further derive different contribution values (i.e., A)

Model parameters of the first preset sub-model corresponding to the any source border router node may be adjusted based on the differential contribution value A to obtain the first preset trained sub-model corresponding to the any source border router node.

Figure 3:
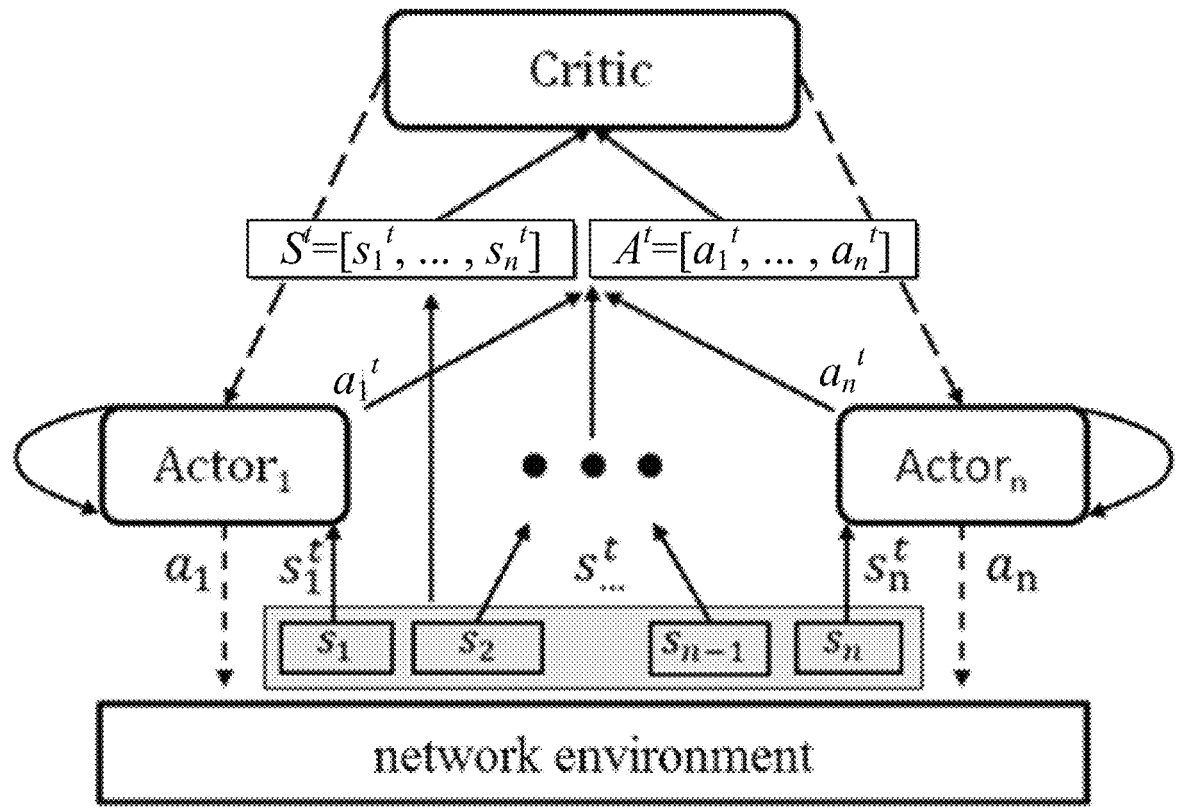
FIG. 3 is a schematic diagram of a present model according to embodiments of the disclosure.

It should be understandable that, each source border router node is corresponding to one first preset sub-model, there is a second preset sub-model, and a plurality of first preset sub-model and the second preset sub-model form a preset model. As illustrated in FIG. 3, each first preset sub-model is named as Actor, and the second preset sub-model is named as Critic. The plurality of first preset sub-models and the second preset sub-model form the preset model. In addition, in order to avoid the interference of the random action exploration process on the real network environment during the reinforcement learning training process, the process of training the model in the embodiments of the disclosure is based on the constructed simulation network environment (the constructed simulation network has the same configuration and topology as the real network) and is based on offline training. The reference state-action value b represents the value of the best action that the strategy model Actor could take in the current state. The contribution value A represents the value of the current action taken by the strategy model Actor to the current overall network environment.

Based on the above embodiments, in some embodiments of the disclosure, the second preset sub-model is trained in the following actions.

At a next moment of the current moment, local network state information collected by each source border router node in the network is inputted into the first preset sub-model corresponding to each source border router node, to output a traffic proportion on each candidate path from each source border router node to the destination border router node.

The traffic proportion corresponding to each source border router node in the network may be combined to obtain a set of traffic proportions; and the local network state information collected by each source border router node may be combined to obtain global network state information.

The set of traffic proportions and the global network state information are inputted into the second preset sub-model, to output a state-action value Q' corresponding to the next moment.

A mean square Bellman error of a current state action may be calculated based on Q' and Q, and model parameters of the second preset sub-model may be adjusted based on the mean square Bellman error to obtain the updated second preset trained sub-model.

The entire training framework (including the plurality of first preset sub-models and the second preset sub-model) adopts a multi-agent Actor-Critic framework. As illustrated in FIG. 3, the training process of the entire framework is detailed below based on FIG. 3.

Each first preset sub-model is called as Actor. The first preset sub-model corresponding to each source border router node in the virtual simulation network is respectively $Actor_1$, $Actor_2$, $Actor_3$, ... $Actor_n$. The second preset sub-model is called as Critic. At the current moment, the local network state information collected by each source border router node in the virtual simulation network is respectively $s_1^t$, $s_2^t$, $s_3^t$, ... $s_n^t$.

The first round of training is performed as follows. $s_i^t$ is inputted into $Actor_1$ to output a traffic proportion $a_1^t$ corresponding to the first source border router node; $s_2^t$ is inputted into $Actor_2$ to output $a_2^t$; and so on; $s_n^t$ is inputted into $Actor_1$ to output $a_n^t$.

$s_1^t$, $s_2^t$, $s_3^t$, ... $s_n^t$ may be combined to obtain the global network state information $S^t$. $a_1^t$, $a_2^t$, $a_3^t$, ... $a_n^t$ may be combined to obtain the set $A^t$ of traffic proportions.

$S^t$ and $A^t$ are inputted into Critic. Critic may be understood as an evaluation model that outputs the corresponding value $Q(S^t, A^t)$, representing the global state-action value in the current state.

Training the model aims to adjust model parameters of each Actor and Critic. The process of adjusting model parameters of each Actor may be as follows. Taken adjusting the model parameters of $Actor_1$ as an example to describe the process of the method. The output result $a_1^t$ of $Actor_1$ is replaced with the default traffic proportion, i.e., the equal proportion (the traffic proportion is equal on each candidate path), the traffic proportion outputted by other Actor remain unchanged, and the above traffic proportions may be combined to obtain an updated set $A^t$ of traffic proportions. $S^t$ is unchanged. The updated set $A^t$ and original $S^t$ are inputted into Critic to output $b_1$ corresponding to $Actor_1$. The contribution value $A_1^t = Q(S^t, A^t) - b_1$ corresponding $Actor_1$ may be obtained based on $Q(S^t, A^t)$ and $b_1$. The model parameters of $Actor_1$ may be adjusted based on $A_1^t$ to obtain the trained model $Actor_1$. For the other $Actor_1$ the corresponding model parameters are adjusted in the same way to obtain the trained model.

The process of adjusting the model parameters of Critic may be follows. For the next moment of the current moment, the local network state information collected by each source border router node in the virtual simulation network is $s_1^{t'}$, $s_2^{t'}$, $s_3^{t'}$, ... $s_n^{t'}$.

The second round of training may be performed. $s_1^{t'}$ is inputted into $Actor_1$ to output a traffic proportion $a_1^{t'}$ corresponding to the first source border router node; $s_2^{t'}$ is inputted into $Actor_1$ to output a traffic proportion $a_2^{t'}$; and so on; $s_n^{t'}$ is inputted into $Actor_1$ to output a traffic proportion $a_n^{t'}$.

$s_1^{t'}$, $s_2^{t'}$, $s_3^{t'}$, ... $s_n^{t'}$ may be combined to obtain the global network state information $S^{t'}$. $a_1^{t'}$, $a_2^{t'}$, $a_3^{t'}$, ... $a_n^{t'}$ may be combined to obtain the set $A^{t'}$ of traffic proportions after combining.

$S^{t'}$ and $A^{t'}$ are inputted into Critic. Critic may be understood as an evaluation model that outputs the corresponding value $Q(S^{t'}, A^{t'})$.

The mean square Bellman error of the current state action may be calculated based on $Q(S^t,A^t)$ and $Q(S^{t'},A^{t'})$. The mean square Bellman error $L(w)$ is denoted as follows:

$$L(w)=(r+\gamma Q(S',A')-Q(S,A))^2.$$

Then, the parameters w of the model Critic may be adjusted according to the gradient descent method based on $L(w)$ to form the trained model. r is a reciprocal of a utilization rate $U_{max}$ of a bottleneck link in the current network environment. γ represents an attenuation factor and has a default value of 0.9. The mean square Bellman error may be expressed as: the square of the error among the evaluation on the current state-action value (i.e., Q), the evaluation on the next state-action value (i.e., Q') obtained through state transition, and the single-step reward r, i.e., $(r+\gamma Q(S',A')-Q(S,A))^2$.

The framework may evaluate the contribution of the current action $a_i$ (the traffic proportion on each candidate path from the source border router node to the destination border router node) of $Actor_i$ (the source border router node) based on the current state, and use the differentiated reward mechanism to provide the differentiated feedback for the action $a_i$ of $Actor_i$, achieving more efficient training efficiency. The framework may include two kinds of modes, namely the model Actor (i.e., the first preset sub-model of the foregoing embodiments) and the model Critic (i.e., the second preset sub-model of the foregoing embodiments). All these models are neural network structures, in which the model Actor has a multilayer network. The model Critic has a multi-layer fully connected neural network structure (set to 5 layers by default), and outputs a single value that represents the contribution of the action of each Actor to the current network environment. Critic is a globally unique entity, and used for training collaborative optimization among Actor, in which the parameter on Actor is represented by $\theta_i$, and the parameter on Critic is represented by w.

In detail, a complete model training (including the plurality of first preset sub-models and the second preset sub-model) is described as follows.

(1) Each $Actor_i$ may take the local network state information $s_i$ (K pieces of information) as an input, and obtains an output result $a_i$ (i.e., the traffic proportion on each candidate path from the current source border router node to the destination border router node).

(2) Global Critic may take the global network state information $S^t=[s_1,L,s_n]$ and output results $A^t=[a_1,L,a_n]$ of all Actor as an input, and obtains an output result $Q(S^t,A^t)$ that represents the total value generated by the combination of the current actions of all Actor in the current network state, that is, the total contribution.

(3) Global Critic may assign the value $A_i^t=Q(S^t,A^t)-b_i$ corresponding to the current action $a_i$ taken by $Actor_i$, in which $b_i=Q(S',A^t-a_i+a_i^{opt})$ represents the best global state-action value resulted from the optimal action $a_i^{opt}$ that the current $Actor_i$ can take under the current situation of fixing actions $A^t-a_i$ of other Actor, and $a_i^{opt}$ represents the optimal action that should be taken by the current $Actor_i$, that is, the proportion on the candidate path should be equal.

(4) Each $Actor_i$ updates its own model parameters based on the evaluated action value $A_i^t$ received from Critic. The update method is mathematically expressed as follows: $\theta_i=\theta_i+\alpha\nabla_{\theta_i}\log\pi_{\theta_i}(s_i,a_i)A_i^t$, where α represents the learning rate, which is set to 0.01 by default; $\pi_{\theta_i}(s_i,a_i)$ represents the strategy function of Actor and employs a complex function composed of neural networks.

(5) The parameters of the model Critic may be updated by using the method of minimizing the mean square Bellman error (BE). The specific update method is expressed as: $w \leftarrow w-\beta\nabla_w L$, in which $L(w)=(r+\gamma Q(S',A')-Q(S,A))^2$ represents the mean square Bellman error of the current action state, S' and A' represent respectively the next state and the optimal strategy combination that should be adopted in the next state when the environment transfers to the next state through the current state S and action A, γ represents the decay factor, which is a fixed value and has a default of 0.9, r is a reciprocal of a utilization rate $U_{max}$ of a bottleneck link in the current network environment, the parameter on Critic is represented by w, and β represents the update step size of the model Critic.

After the above five steps, a complete training process is completed. In this way, after continuous repeated training, an adjustment model is constructed to achieve the goal of multi-agent collaborative optimization.

Based on the above embodiments, in some embodiments of the disclosure, after output the traffic proportion on each candidate path from the source border router node to the destination border router node, the method further includes: selecting one candidate path from candidate paths from the source border router node to the destination border router node for a data packet on each newly arrived flow, as a forwarding path of the data packet on each newly arrived flow through the network, based the traffic proportion on each candidate path from the source border router node to the destination border router node; and forwarding the data packets on each newly arrived flow to the destination border router node in a network domain based on the selected candidate path using a source routing technology.

It is understandable that when it is necessary to adjust the traffic proportions of the plurality of candidate paths from a certain source border router node to a certain destination border router node in the network system, the maximum link utilization rate of each candidate path and the maximum queuing length information of all network devices on each candidate path, which are collected by the certain border router node, may be inputted into the first preset trained sub-model, to obtain the traffic proportion on each candidate path from the certain source border router node to the certain destination border router node. The border router node, based on the traffic proportion, may select one candidate path from each candidate path from the source border router node to the destination border router node for a data packet on each newly arrived flow, and forward the data packet on each newly arrived flow to the egress border router node (i.e., the destination router node) in a network domain based on the selected candidate path using a source routing technology (such as segment routing, SR).

Experiments have been carried out in different network topologies for the method for dynamically adjusting traffic for the network provided in the embodiments of the disclosure, and the results have been showed that compared with existing solutions (including reinforcement learning solutions and conventional protocols such as OSPF (Open Shortest Path First Interior Gateway Protocol)), it may effectively reduce the utilization of bottleneck network links in a network system by 26%-85%.

Figure 4:
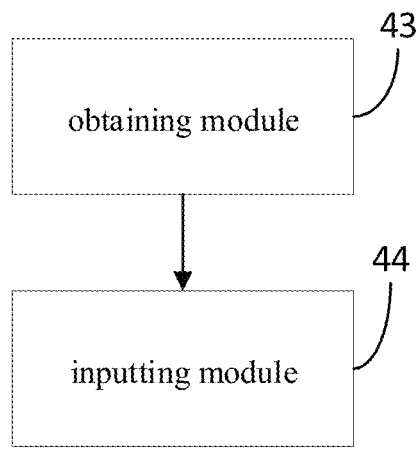
FIG. 4 is a block diagram of a system for dynamically adjusting traffic for a network according to embodiments of the disclosure.

A system for dynamically adjusting traffic for a network is also provided in embodiments of the disclosure. The system is configured to implement the methods in the foregoing embodiments. Therefore, the descriptions and definitions in various method embodiments may be used for understanding of each execution module in the embodiments of the disclosure. FIG. 4 is a block diagram of a system for dynamically adjusting traffic for a network according to embodiments of the disclosure. As shown in FIG. 4, the method includes an obtaining module 43 and an inputting module 44.

The obtaining module 43 is configured to obtain local network state information collected by any border router node in the network.

The inputting module 44 is configured to input the local network state information collected by the any border router node into a corresponding first preset trained sub-model, to output a traffic proportion on each candidate path from a source border router node to a destination border router node. The source border router node is the any border router node, and the destination border router node is an egress border router node in the network.

Figure 5:
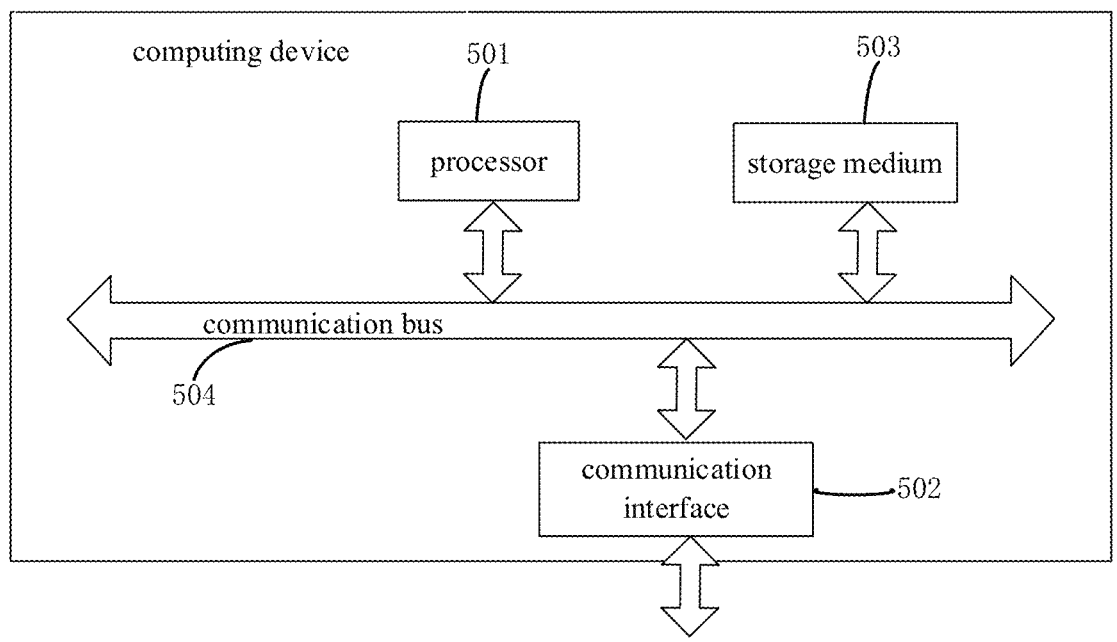
FIG. 5 is a block diagram of a computing device according to embodiments of the disclosure.

FIG. 5 is a block diagram of a computing device according to embodiments of the disclosure. As shown in FIG. 5, the computing device may include a processor 501, a communication interface 502, a storage medium 503, and a communication bus 504. The processor 501, the communication interface 502, and the storage medium 503 may communicate with each other through the communication bus 504. The processor 501 may call logic instructions from the storage medium 503, to carry out the following method: obtaining local network state information collected by any border router node in the network; and inputting the local network state information collected by the any border router node into a corresponding first preset trained sub-model, to output a traffic proportion on each candidate path from a source border router node to a destination border router node.

Computing devices are intended to represent various forms of digital computers, such as laptop computers, desktop computers, workbenches, personal digital assistants, servers, blade servers, mainframe computers, and other suitable computers. Computing devices may also represent various forms of mobile devices, such as personal digital processing, cellular phones, smart phones, routing devices, and other similar computing devices. The components shown here, their connections and relations, and their functions are merely examples, and are not intended to limit the implementation of the disclosure described and/or required herein.

The storage medium 503 is a non-transitory computer-readable storage medium according to the disclosure. The storage medium stores instructions executable by the processor 501, so that the processor 501 executes the method according to the disclosure. The non-transitory computer-readable storage medium according to the disclosure stores computer instructions that are configured to cause the computing device to execute the method according to the disclosure (the method as illustrated in FIG. 1).

As the non-transitory computer-readable storage medium, the storage medium 503 is configured to store non-transitory software programs, non-transitory computer executable programs and modules, such as program instructions/modules corresponding to the method of the disclosure (For example, the obtaining module 43 and the inputting module 44). The processor 501 executes various functional applications and data processing by running non-transitory software programs, instructions, and modules stored in the storage medium 503, that is, implementing the method in the foregoing embodiment of FIG. 1.

The storage medium 503 may include a storage program area and a storage data area, where the storage program area may store an operating system and application programs required for at least one function. In addition, the storage medium 503 may include a high-speed random-access storage medium, and a non-transitory storage medium, such as at least one magnetic disk storage device, a flash storage medium device, or other non-transitory solid-state storage device. In some embodiments, the storage medium 503 may optionally include a storage medium remotely disposed with respect to the processor 501, and these remote memories may be connected to the computing device through a network. Examples of the above network include, but are not limited to, the Internet, an intranet, a local area network, a mobile communication network, and combinations thereof.

In addition, the above-mentioned logic instructions in the storage medium 503 may be implemented in a form of software functional units and sold or used as an independent product, which may be stored in a computer readable storage medium. Based on this understanding, technical solutions of the disclosure essentially, or the part that contributes to the existing technology, or the part of the technical solutions may be embodied in a form of software product. The software product is stored in a storage medium, including several instructions configured to make a computer device (which may be a personal computer, a server, or a network device, etc.) to execute all or part of the actions of the methods described in the various embodiments of the disclosure.

A non-transitory computer-readable storage medium is also provided in embodiments of the disclosure. The non-transitory computer-readable storage medium stores computer instructions. The computer instructions may cause a computer to execute the methods provided in the foregoing method embodiments, for example, including: obtaining local network state information collected by any border router node in the network; and inputting the local network state information collected by the any border router node into a corresponding first preset trained sub-model, to output a traffic proportion on each candidate path from a source border router node to a destination border router node.

The embodiments of the disclosure provide a method for dynamically adjusting traffic for a network, a system for dynamically adjusting traffic for a network, a computing device, and a storage medium. The method may adjust the network traffic on the network path based on the local network state information collected by the border router node in the network, which may adjust the traffic proportion on each path automatically and timely when the environment changes to ensure the stable operation of the network system.

Various embodiments and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein. The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

What is claimed is:

1. A method for adjusting network traffic, comprising:
   obtaining local network state information collected by any border router node in a network; and
   inputting the local network state information collected by the any border router node into a corresponding first preset trained sub-model, to output a proportion of traffic dispatched on each candidate path from a source border router node to a destination border router node, the source border router node being the any border router node, and the destination border router node being an egress border router node in the network;
   wherein each source border router node is corresponding to one first preset sub-model, there is a second preset sub-model, and a plurality of first preset sub-model and the second preset sub-model form a preset model; and
   wherein each first preset sub-model is trained to obtain the first preset trained sub-model of the any border router node by the following actions:
      inputting first local network state information collected at a current moment by each source border router node in the network into the first preset sub-model, to output a first traffic proportion on each candidate path from each source border router node to the destination border router node;
      combining the first traffic proportion on each candidate path from each source border router node in the network to obtain a set of first traffic proportions; combining the first local network state information collected by each source border router node to obtain first global network state information;
      inputting the set of first traffic proportions and the first global network state information into the second preset sub-model, to output a first state-action value;
      replacing one traffic proportion in the set of first traffic proportions of any source border router node with an equal proportion, while keeping other traffic proportions in the set of first traffic proportions unchanged, to form an updated set of first traffic proportions;
      inputting the updated set of first traffic proportions and the first global network state information into the second preset sub-model again, to output a reference state-action value corresponding to the any source border router node;
      obtaining a contribution value corresponding to a first state action of the any source border router node based on the first state-action value and the reference state-action value corresponding to the any source border router node; and
      adjusting model parameters of the first preset sub-model corresponding to the any source border router node based on the contribution value to obtain the first preset trained sub-model corresponding to the any source border router node.

2. The method as claimed in claim 1, wherein the local network state information collected by the any border router node comprises a maximum link utilization rate of each candidate path from the source border router node to the destination border router node, and a maximum queuing length information of all network devices on each candidate path from the source border router node to the destination border router node.

3. The method as claimed in claim 1, further comprising:
   determining a plurality of candidate paths from all network paths from the source border router node to the destination border router node through a preset method.

4. The method as claimed in claim 3, wherein determining the plurality of candidate paths from all network paths from the source border router node to the destination border router node through the preset method comprises:
   calculating the plurality of candidate paths with diversity from all network paths from the source border router node to the destination border router node through an oblivious routing algorithm; or
   calculating the plurality of candidate paths from all network paths from the source border router node to the destination border router node through K-shortest path first (SPF) algorithm.

5. The method as claimed in claim 1, wherein the second preset sub-model is trained by the following actions:
   inputting second local network state information collected at a next moment of the current moment by each source border router node in the network into the first preset sub-model corresponding to each source border router node, to output a second traffic proportion on each candidate path from each source border router node to the destination border router node;
   combining the second traffic proportion on each candidate path from each source border router node in the network to obtain a set of second traffic proportions;
combining the second local network state information collected by each source border router node to obtain second global network state information;
inputting the set of second traffic proportions and the second global network state information into the second preset sub-model, to output a second state-action value corresponding to the next moment; and
calculating a mean square Bellman error of the first state action based on the second state-action value and the first state-action value, and adjusting model parameters of the second preset sub-model based on the mean square Bellman error to obtain the second preset trained sub-model.

6. The method as claimed in claim 1, further comprising:
selecting one candidate path, from candidate paths from the source border router node to the destination border router node for a data packet on each newly arrived flow, as a forwarding path of the data packet on each newly arrived flow through the network, based on the proportion of traffic dispatched on each candidate path from the source border router node to the destination border router node; and
forwarding the data packet on each newly arrived flow to the destination border router node in a network domain based on the selected candidate path using a source routing technology.

7. A computing device, comprising:
a storage medium;
a processor; and
a computer program stored on the storage medium and capable of running on the processor,
wherein the processor is configured to, when executing the program, carry out:
obtaining local network state information collected by any border router node in a network; and
inputting the local network state information collected by the any border router node into a corresponding first preset trained sub-model, to output a proportion of traffic dispatched on each candidate path from a source border router node to a destination border router node, the source border router node being the any border router node, and the destination border router node being an egress border router node in the network;
wherein each source border router node is corresponding to one first preset sub-model, there is a second preset sub-model, and a plurality of first preset sub-model and the second preset sub-model form a preset model; and
wherein each first preset sub-model is trained to obtain the first preset trained sub-model of the any border router node by the following actions:
inputting first local network state information collected at a current moment by each source border router node in the network into the first preset sub-model, to output a first traffic proportion on each candidate path from each source border router node to the destination border router node;
combining the first traffic proportion on each candidate path from each source border router node in the network to obtain a set of first traffic proportions;
combining the first local network state information collected by each source border router node to obtain first global network state information;
inputting the set of first traffic proportions and the first global network state information into the second preset sub-model, to output a first state-action value;
replacing one traffic proportion in the set of first traffic proportions of any source border router node with an equal proportion, while keeping other traffic proportions in the set of first traffic proportions unchanged, to form an updated set of first traffic proportions;
inputting the updated set of first traffic proportions and the first global network state information into the second preset sub-model again, to output a reference state-action value corresponding to the any source border router node;
obtaining a contribution value corresponding to a first state action of the any source border router node based on the first state-action value and the reference state-action value corresponding to the any source border router node; and
adjusting model parameters of the first preset sub-model corresponding to the any source border router node based on the contribution value to obtain the first preset trained sub-model corresponding to the any source border router node.

8. The computing device as claimed in claim 7, wherein the local network state information collected by the any border router node comprises a maximum link utilization rate of each candidate path from the source border router node to the destination border router node, and a maximum queuing length information of all network devices on each candidate path from the source border router node to the destination border router node.

9. The computing device as claimed in claim 7, wherein the processor is further configured to, when executing the program, carry out:
determining a plurality of candidate paths from all network paths from the source border router node to the destination border router node through a preset method.

10. The computing device as claimed in claim 9, wherein determining the plurality of candidate paths from all network paths from the source border router node to the destination border router node through the preset method comprises:
calculating the plurality of candidate paths with diversity from all network paths from the source border router node to the destination border router node through an oblivious routing algorithm; or
calculating the plurality of candidate paths from all network paths from the source border router node to the destination border router node through K-shortest path first (SPF) algorithm.

11. The computing device as claimed in claim 7, wherein the processor is further configured to, when executing the program, to train the second preset sub-model by the following actions:
inputting second local network state information collected at a next moment of the current moment by each source border router node in the network into the first preset sub-model corresponding to each source border router node, to output a second traffic proportion on each candidate path from each source border router node to the destination border router node;
combining the second traffic proportion on each candidate path from each source border router node in the network to obtain a set of second traffic proportions;
combining the second local network state information collected by each source border router node to obtain second global network state information;
inputting the set of second traffic proportions and the second global network state information into the second preset sub-model, to output a second state-action value corresponding to the next moment; and calculating a mean square Bellman error of the first state action based on the second state-action value and the first state-action value, and adjusting model parameters of the second preset sub-model based on the mean square Bellman error to obtain the second preset trained sub-model.

12. The computing device as claimed in claim 7, wherein the processor is further configured to, when executing the program, carry out:

selecting one candidate path candidate paths from the source border router node to the destination border router node for a data packet on each newly arrived flow, as a forwarding path of the data packet on each newly arrived flow through the network, based on the proportion of traffic dispatched on each candidate path from the source border router node to the destination border router node; and forwarding the data packet on each newly arrived flow to the destination border router node in a network domain based on the selected candidate path using a source routing technology.

13. A non-transitory computer-readable storage medium having stored therein instructions that, when executed by a processor of a computer, causes the computer to perform a method for adjusting traffic for a network, the method comprising:

obtaining local network state information collected by any border router node in a network; and inputting the local network state information collected by the any border router node into a corresponding first preset trained sub-model, to output a proportion of traffic dispatched on each candidate path from a source border router node to a destination border router node, the source border router node being the any border router node, and the destination border router node being an egress border router node in the network;

wherein each source border router node is corresponding to one first preset sub-model, there is a second preset sub-model, and a plurality of first preset sub-model and the second preset sub-model form a preset model; and wherein each first preset sub-model is trained to obtain the first preset trained sub-model of the any border router node by the following actions:

inputting first local network state information collected at a current moment by each source border router node in the network into the first preset sub-model, to output a first traffic proportion on each candidate path from each source border router node to the destination border router node;

combining the first traffic proportion on each candidate path from each source border router node in the network to obtain a set of first traffic proportions; combining the first local network state information collected by each source border router node to obtain first global network state information;

inputting the set of first traffic proportions and the first global network state information into the second preset sub-model, to output a first state-action value;

replacing one traffic proportion in the set of first traffic proportions of any source border router node with an equal proportion, while keeping other traffic proportions in the set of first traffic proportions unchanged, to form an updated set of first traffic proportions;

inputting the updated set of first traffic proportions and the first global network state information into the second preset sub-model again, to output a reference state-action value corresponding to the any source border router node;

obtaining a contribution value corresponding to a first state action of the any source border router node based on the first state-action value and the reference state-action value corresponding to the any source border router node; and adjusting model parameters of the first preset sub-model corresponding to the any source border router node based on the contribution value to obtain the first preset trained sub-model corresponding to the any source border router node.

14. The non-transitory computer-readable storage medium as claimed in claim 13, wherein the local network state information collected by the any border router node comprises a maximum link utilization rate of each candidate path from the source border router node to the destination border router node, and a maximum queuing length information of all network devices on each candidate path from the source border router node to the destination border router node.

15. The non-transitory computer-readable storage medium as claimed in claim 13, wherein the method further comprises: determining a plurality of candidate paths from all network paths from the source border router node to the destination border router node through a preset method.

16. The non-transitory computer-readable storage medium as claimed in claim 15, wherein determining the plurality of candidate paths from all network paths from the source border router node to the destination border router node through the preset method comprises:

calculating the plurality of candidate paths with diversity from all network paths from the source border router node to the destination border router node through an oblivious routing algorithm; or calculating the plurality of candidate paths from all network paths from the source border router node to the destination border router node through K-shortest path first (SPF) algorithm.

17. The non-transitory computer-readable storage medium as claimed in claim 13, wherein the second preset sub-model is trained by the following actions:

inputting second local network state information collected at a next moment of the current moment by each source border router node in the network into the first preset sub-model corresponding to each source border router node, to output a second traffic proportion on each candidate path from each source border router node to the destination border router node;

combining the second traffic proportion on each candidate path from each source border router node in the network to obtain a set of second traffic proportions; combining the second local network state information collected by each source border router node to obtain second global network state information;

inputting the set of second traffic proportions and the second global network state information into the second preset sub-model, to output a second state-action value corresponding to the next moment; and calculating a mean square Bellman error of the first state action based on the second state-action value and the first state-action value, and adjusting model parameters of the second preset sub-model based on the mean square Bellman error to obtain the second preset trained sub-model.

* * * * *